July 26, 1938. W. E. SYKES 2,124,990
CUTTER SHARPENING MACHINE
Filed Oct. 22, 1934 3 Sheets-Sheet 2
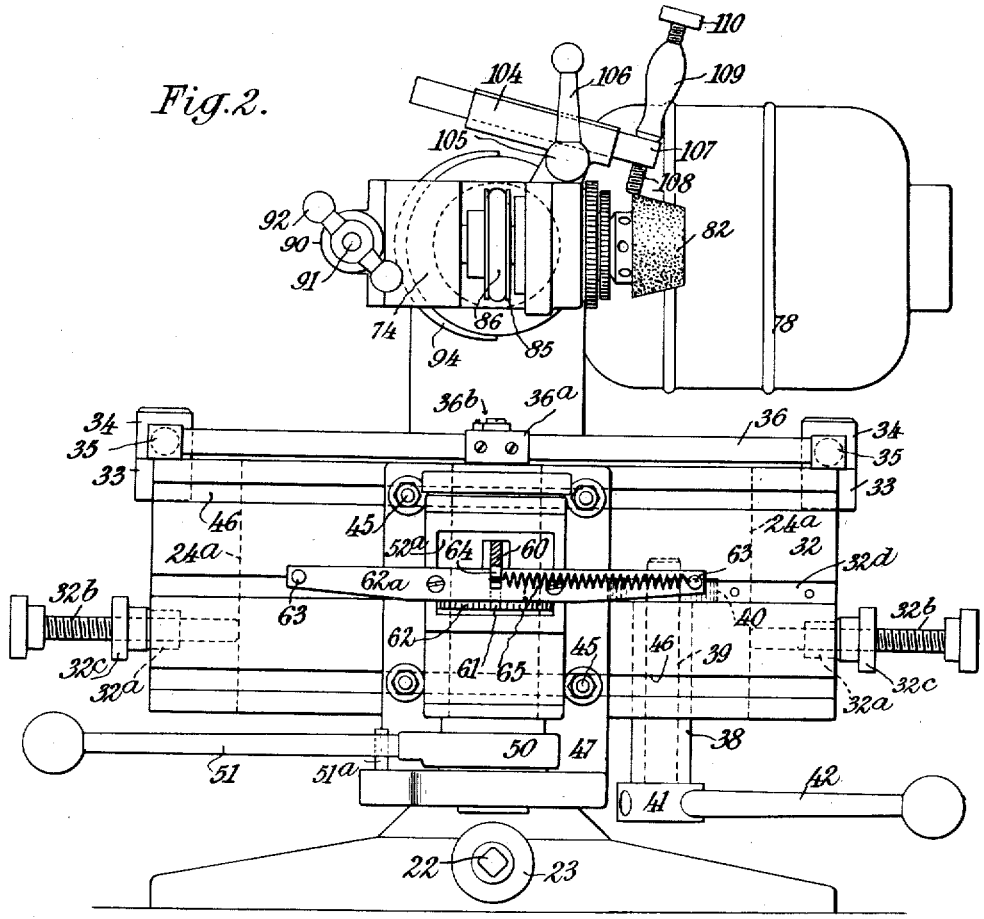
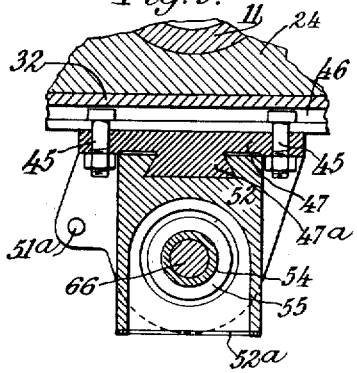
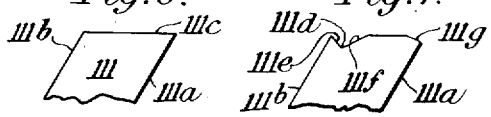
INVENTOR
William E. Sykes,
BY
Fraser, Myers & Manley
ATTORNEYS.

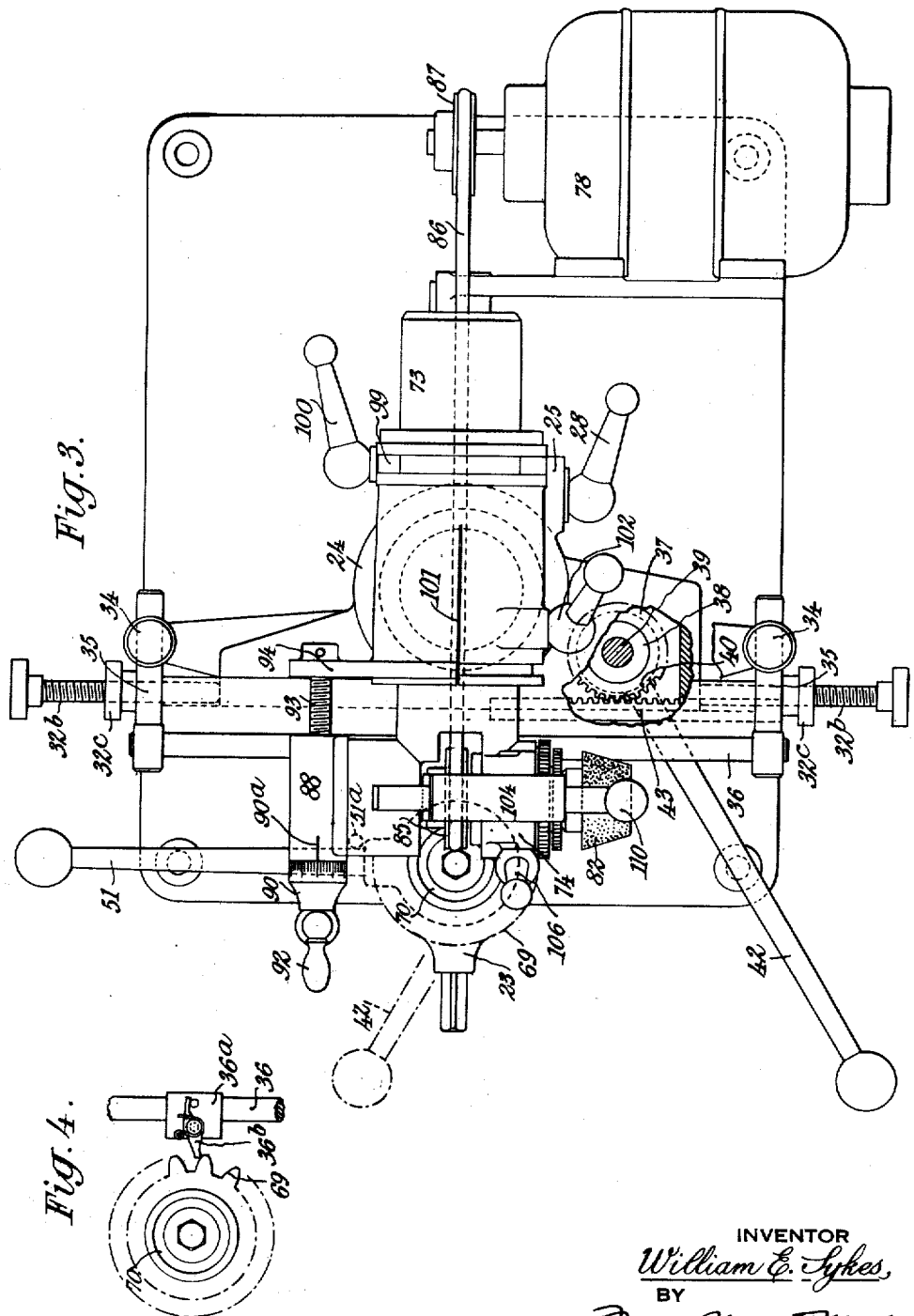

Patented July 26, 1938

2,124,990

UNITED STATES PATENT OFFICE 2,124,990

CUTTER SHARPENING MACHINE

William E. Sykes, Buffalo, N. Y.

Application October 22, 1934, Serial No. 749,342

16 Claims. (Cl. 51—95)

My present invention relates to a machine for sharpening gear cutters of the wheel or pinion type, and particularly those in which the cutter teeth are helically arranged on the periphery of the cutter. These cutters are largely used in the production of spiral gears, both of the single helical and herringbone types, worm gears, worm wheels, etc. Such cutters have teeth the contours of which are frequently as near as practicable true involute surfaces struck from the base circle of the cutter, whereas in other instances this form is materially deviated from. The cutting edges of one side of the teeth of these cutters lie in a plane of rotation of the cutter, that is to say, in a plane normal to the cutter axis and the cutting edges of the other side of the teeth in another plane parallel and usually close to the first plane.

In order that these cutters be satisfactory for cutting work, their edges on both the positive and the negative sides of the teeth are suitably dressed or sharpened to provide proper cutting angles, which, in practice, have been found to be somewhat less than a right angle. In use these cutters also require re-sharpening, and such original sharpening and re-sharpening may be done in any preferred manner by hand or machine. One such machine is disclosed in my copending application, Serial No. 710,261, filed February 8, 1934, now Patent No. 2,108,239, dated Feb. 15, 1938, according to which, cutters of different diameter, thickness and number of teeth can be quickly sharpened and wherein the work-supporting table of the machine is mounted on a pivotal axis which is displaceable relatively to the grinder face to permit swinging of the cutter teeth past the grinding face in any desired arc within which the edge of the cutter tooth will wholly or partly lie. According to said machine the edge of the cutter tooth from the apex to the base thereof will ordinarily lie in the arc described without adjustment, and if a second cut is required on the same edge, a proper adjustment will be made to elevate the cutter or displace the pivotal axis of the work table with or without changing the radius of the arc.

According to my present invention the cutting edge to be ground is presented to the grinder face in a curve which closely corresponds to the curvature of the side of the tooth. In other words, if the side of the tooth is a true involute surface the tooth edge to be ground will move from the apex to the base circle, or vice versa, past the grinding face in a corresponding true involute curve. By using a grinding wheel with both a disc and a conical surface both convex and concave surfaces may be formed at the cutting edges. My present invention contemplates accomplishing this in a very simple manner for any diameter, thickness and tooth contour of cutter within the range of the machine without the necessity of making complicated adjustments of the machine.

It is accordingly the principal object of my invention to provide a cutter sharpening machine especially adapted to sharpen helical gear cutters in a manner such that the grinding cut will closely correspond to the curvature of the side of the cutter tooth. A further object is to provide such machine which will be equally efficient in grinding both right and left hand cutters and both sides of each cutter tooth where their sides are either positive or negative and where the edges of the teeth are in the same or different planes. A further object is to provide such machine which will be simple, rapid and accurate in operation.

The foregoing and other objects and features of my invention will be better understood from the detailed description which follows, when considered in conjunction with the accompanying drawings, which illustrate a preferred embodiment thereof, and wherein Figure 1 is a vertical section, with parts shown in elevation, of a machine embodying my invention.

Fig. 2 is a front elevation of the machine shown in Fig. 1, with the grinding wheel disposed at a right angle to that shown in Fig. 1.

Fig. 3 is a top plan view with parts broken away, of the machine shown in Fig. 2.

Fig. 4 is a top plan view of a detail of the invention.

Fig. 5 is a section taken substantially along the plane of the line 5—5 in Fig. 1.

Figs. 6 and 7 are face views of one form of cutter tooth prior to and after the cutting or sharpening operation, respectively.

Figs. 8 and 9 are similar views to 6 and 7 with respect to a different form of cutter tooth.

Fig. 10 is a top plan view of a portion of the tooth shown in Fig. 9.

Figure 1:
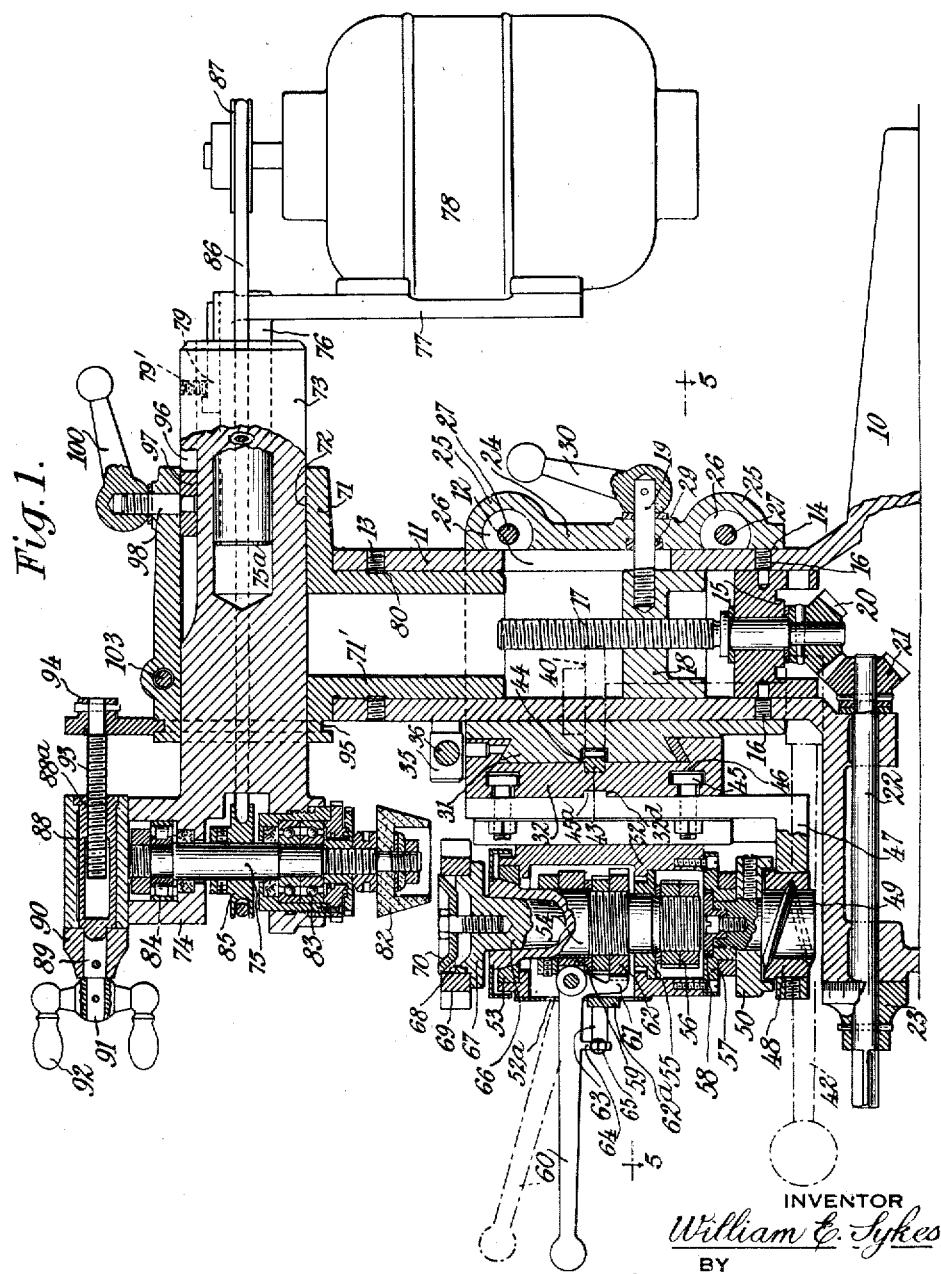

Referring to the drawings, let 10 indicate the base of the machine having a hollow vertical standard 11 formed with a vertical slot 12, radially-extending screw-threaded holes 13 near its top and radially-extending screw-threaded holes 14 near its bottom. Mounted within the hollow standard 11 near its base is a vertical screw bearing 15 which is fixedly held in position by screw-threaded pins 16. Mounted for rotation in said bearing is a vertical screw-threaded stud 17 upon which is threaded a slidable nut 18, which is held against rotation within the standard by a screw-threaded pin 19 engaging in said nut and extending through the slot 12. Fixedly mounted at the lower end of the stud 17 is a miter-gear 20 in meshing engagement with a second miter-gear 21 fixedly mounted at the inner end of a horizontal shaft 22 which extends through the base 10 at the front thereof. Carried by the outer end of the shaft 22 for rotation therewith is a micrometer collar 23 for cooperation with an index (not shown) on the base 10, rotation of the shaft 22 by any suitable engaging means applied to the outer end of said shaft serving to raise or lower the nut 18 within the standard.

Fitted over the exterior of the standard 11 is a table mounting bracket 24 formed at its rear with enlargements 25 extending transversely thereof and within which are fitted bushings 26 and binding studs 27, to the outer ends of which are connected two-ball levers 28 (Fig. 3) for clamping the bracket onto the standard. The bracket 24 is also formed with a transverse arcuate slot 29, through which the pin 19 extends and to the outer end of which is secured a two-ball locking lever 30 which permits limited radial adjustment of the table bracket around the standard. The table bracket mounting at the front of the standard is formed with an elongated flat vertical wall horizontally grooved at its top and bottom to provide a dovetail element 31 which slidably engages in a dovetail slot formed in a table 32. Extending laterally adjacent the top edge of the bracket 24 slightly rearwardly of the front face thereof are a pair of lugs 33 (Fig. 2) providing vertical bearings for support studs 34 through which extend supports 35, which at their forward ends support a cross-bar 36. The supports 35 are adjustably mounted in the support studs 34 so as to vary the distance of the cross-bar from the standard. Longitudinally adjustable upon the cross-bar 36 is a ratchet block 36a which carries a spring-tensioned ratchet finger 36b. The bracket 24 is also formed with a bearing 37 (Fig. 3) within which is mounted a bushing 38 through which extends a gear shaft 39 at the top of which is affixed a gear 40 and at the bottom of which is affixed a collar 41, to which is connected a traversing ball end lever 42. To accommodate the gear 40 the bracket 24 is suitably recessed above the bearing 37. The gear 40 is in mesh with a rack 43 mounted in a groove in the rear face of the table 32 and extending into a clearance groove 44 in the outer face of the dovetail element 31 of the bracket 24. For limiting the movement of the table 32 in both directions when moved through the action of the gear 40 and rack 43, there is fixed to the back of said table near each end thereof a nut 32a, through which is threaded a stop stud 32b, the ends of which are adapted to engage the ends 24a of the flat, elongate wall of the bracket 24. To hold the stop studs in adjusted position, check-nuts 32c may be employed.

Supported by the table 32 for slidable adjustment thereon through the medium of a rib 45a engaging in a groove 32d and T-head bolts 45 engaged in longitudinal T-slots 46 in the table is an L-shaped bracket 47, in the horizontal arm of which is mounted a quick-acting left hand threaded nut 48. Threadedly engaging in said nut is a relieving screw 49 having a reduced shank, to which is fixed a collar 50 having an operating lever 51 connected thereto. For limiting the throw of the lever 51, a stop 51a is provided on the horizontal arm of the bracket 47. The vertical arm of the L-shaped bracket 47 is formed with a dovetail projection 47a, over which is slidably mounted a housing or casting 52 having a complemental dovetail recess. The housing 52 near its top is formed with an annular shoulder within which seats a spindle bearing 53 having a conical inner wall which supports a spindle 54 at its top. A second bearing 55 for said spindle is located intermediate the ends of the housing and is supported by a pair of lock nuts 56 carried by the spindle. The housing 52 at its bottom is provided with a cover 57, which, on its upper face, supports a retaining plate 58 which is secured to the shank of the screw 49. The lower end of the cover 57 rests upon the collar 50, in view of which construction it will be apparent that the screw 49 supports the housing 52 containing the spindle 54. Rotatably mounted on the spindle 54 is a collar 59 which pivotally supports a latch lever 60 having a latch 61 which is normally held in engagement with a tooth of a gear 62 fixedly mounted upon the spindle 54. The housing 52 has a suitable opening 52a in the front wall thereof through which the lever 60 extends, whereby said lever is permitted limited movement in both a vertical and horizontal direction. Mounted upon the front of the housing 52 is a spring-supporting bar 62a having spring-binding posts 63. The lever 60 has a depending pin or spring-binding post 64 to which one end of a helical coil spring 65 is attached, the other end of said spring being attached to either of the spring-binding posts 63 depending upon the direction in which tension is to be applied upon the lever 60.

The spindle 54 is preferably formed with a tapered bore for accommodating the tapered shank 66 of a cutter support 67 having a hub 68 over which the work, such as a cutter 69 to be sharpened can be positioned. To hold the cutter upon the support any suitable means may be employed, for example, a clamping washer or cap 70 which may be threadedly engaged in the top of the cutter support 67.

Mounted in the hollow top of the standard 11 is a tubular bearing portion 71' of a spindle housing carrier 71 having a horizontal bore 72 providing a bearing for a spindle 73, which, at one end, is formed as a housing 74 for a grinding wheel shaft 75, and at its other end is axially recessed, as indicated at 75a, to receive the shank 76 of a motor support 77, upon which is mounted an electric motor 78. To hold the motor support in definite fixed relation with respect to the spindle 73, the bore 75a of the latter and the shank 76 of the motor support are provided with key-ways for accommodating the locking gey 79 which may be held in locking position by a set screw 79'. To hold the spindle housing carrier 71 in any adjusted position about a vertical axis with respect to the standard 11, the bearing 71' is formed with an annular recess 80 for receiving set screws extending through the threaded holes 13 in the standard.

The grinding wheel shaft 75 within the housing 74 carries at its free end a grinding wheel 82 and is suitably mounted upon ball bearings 83 and a roller bearing 84, the said shaft also having mounted thereon approximately midway between its ends, a sheave 85 over which is trained a driving belt 86 which engages over a sheave 87 mounted on the motor shaft. To accommodate the driving belt 86, the spindle 73 is suitably grooved longitudinally thereof.

To adjust the grinding wheel forwardly of the standard 11 the housing 74 has fitted in one end thereof a pillow block 88 having therein an adjusting nut 88a provided with a shank 89 extending therethrough and upon which is mounted a micrometer collar 90 for cooperation with an index 90a on the housing. For rotating said nut a further extension 91 of said nut has affixed thereto an operating rest handle 92. Threadedly engaged through said nut is a screw-threaded stem 93, to the outer end of which is fixed an arcuate yoke 94, the inner periphery of which engages within an annular recess or groove 95 formed adjacent one end of the spindle housing carrier 71. It will thus be apparent that by rotating the handle 92 the spindle 73 can be moved inwardly or outwardly of the spindle housing carrier 71.

It is necessary to adjust the grinding wheel about the axis of the carrying spindle 73, and this may be readily accomplished by forming in said spindle an elongate groove or slot 96 within which is slidable a binder element 97 which carries a screw-threaded pin 98 which extends through an arcuate recess 99 in the housing carrier 71, and at the outer end of which screw-threaded member is carried a clamping lever 100. For effecting the quick and efficient binding action of the carrier 71 with respect to the spindle 73, the former may be longitudinally split, as indicated at 101 (Fig. 3), and the divided portions adapted for quick locking engagement through the medium of a binding lever 102 controlling locking screw 103.

The grinding wheel 82, as herein shown, is of frusto-conical contour, and for dressing said wheel or any other wheel mounted in its stead, there is adjustably carried on the housing 74 about a pivoted axis 105 by an operating handle 106, a slide bearing 104. Extending through said bearing 104 is a dresser slide 107, which, at its forward end, has mounted therethrough a screw-threaded stud 108 having a diamond mounted in the end thereof, said stud being fitted with a handle 109 through which the stud is adjustable through its enlarged head 110.

In Fig. 6 I have shown an end face view of a helical tooth 111 having a positive side 111a and a negative side 111b and a top face 111c. The edges formed by the intersection of the faces 111a and 111c and between 111b and 111c being unsuitable for cutting edges, they are modified, as shown in Fig. 7, by providing a cut 111d in the top face of the tooth to provide a concave surface 111e and a convex surface 111f, and by a cut providing a convex surface 111g, the edges at the intersection of the surfaces 111b and 111e and between 111a and 111g being better suited for cutting purposes. In Fig. 8 both sides of the gear tooth 112 are slightly negative, and to render the edges at the intersection of said sides with the top of the tooth more suitable for cutting purposes, the top of said tooth is cut away to provide the concave surfaces 112a and 112b. The edges formed by the intersection of the surfaces 112a and 112b with the respective sides of the tooth may lie in the same or in different parallel planes disposed at right angles to the axis of the cutter. Fig. 10 shows a plan view of the top of the sharpened cutter tooth shown in Fig. 9.

In the operation of the device the cutter 68 to be sharpened is mounted upon the cutter support 67, which is positioned within the indexing spindle 54 within the vertical slidable housing 52, and the cutter brought into position below the grinding wheel 82 so that the ratchet finger or guide 36b will engage against the side of the tooth to be sharpened. The cutter thus provides a self-indexing ratchet wheel with said finger. The grinding wheel 82 is then radially adjusted about the axis of the spindle 73 to provide a proper angle of cut for the tooth edge to be sharpened and also adjusted along the longitudinal axis of the housing so as to engage the cutter teeth when presented beneath the grinding wheel. Where the positive side of a tooth is to be sharpened, the disc surface of the grinding wheel is used, while for sharpening the negative side of a tooth the conical surface of the grinding wheel is primarily used. The stop studs 32b are then adjusted and held in adjusted position by means of the check-nuts 32c to limit the longitudinal movement of the table 32 to control the length of the grinding cut. The bracket 24, together with the table 32, are then raised through the rotation of the shaft 22 to bring the cutter into contact with the grinding wheel, whereupon, by moving the lever 42 to the left from its position shown in Fig. 2, the table and the cutter support will be moved in a horizontal plane through the medium of the gear 40 and rack 43. During this movement the cutter is not restrained against rotational movement about its axis, and due to the engagement of the ratchet finger 36b with the side of the cutter, it will be apparent that as the axis of the cutter is moved from right to left with the table, the cutter will be constrained to move about its own axis due to the restraining influence of the finger 36b upon the cutter tooth. The composite or resultant motion of the cutter due to this movement of translation and rotation will be in a curve corresponding to the curvature of the tooth face which is engaged by the finger. And where this tooth face is a true involute surface, the resulting curve through which the tooth will move will be a corresponding involute. During this motion the edge of the cutter in contact with the grinding wheel will move through the corresponding curve, hence the grinding cut will be made along a curve corresponding to the curvature of the side of the tooth face from its apex to its base circle. When the grinding cut is completed the lever 51 is moved to the right, by which action the housing 52 supported upon the screw 49 will be quickly lowered out of the field of action of the grinding wheel, and as this is done, lever 60 is raised to disengage the gear 62 and moved to the left against the tension of the spring 65 to engage the next or a spaced tooth of said gear to rotate the cutter upon its axis an amount sufficient to bring the next cutter tooth into position for engagement with the finger 36b when the cutter support is returned to its operative plane. In this adjusting action the finger 36b acts as a ratchet in conjunction with the cutter to hold the cutter in its new position as the lever 60 and gear 62 are returned by the action of the spring 65. The table 32 is then returned to its original position by movement of the lever 42 to the right, after which the lever 51 is moved to the left to elevate the housing 52 to its operative plane at which the cutting or grinding operations are being made. The lever 42 is then again moved to the left for taking a cut upon the next tooth, and the series of movements above set forth for returning the next successive tooth of the cutter for presentation to the grinding wheel are repeated until all of the teeth have had a cut taken therefrom. After a cut has been taken from all of the teeth a second cut may be taken thereon, the amount of which will be determined by the extent to which the bracket 24 and its carrying table 32 are elevated by rotation of the shaft 22, as indicated by the micrometer collar 23.

As indicated in Fig. 4, the sharpening cut as above explained has been taken from the left hand side of the cutter teeth. For sharpening the right hand side of the tooth edge the same procedure is followed, subject to the following variation. The ratchet finger 36b is reversed so as to engage the right hand side face of the tooth, and the spring 65 is reversed so as to connect with the left hand binding post 63 on the spring bar 62. The stop studs 32b are adjusted to limit the movement of the table 32 from left to right, and when taking the grinding cut the lever 42 is moved from left to right instead of manipulated so as to rotate the cutter about its from right to left. Likewise, the lever 60 must be manipulated so as to rotate the cutter about its axis in a counter-clockwise direction.

It will be apparent that in view of the capability of the various adjustments of the machine, namely, the adjustment of the table vertically of the standard and transversely thereof; of the ratchet bar 36 transversely of the bracket 24 and of the grinding wheel about the axis of the housing 73 and longitudinally of said axis and about the vertical axis of the standard, the machine is adapted for sharpening helical cutter wheels and the like having different thicknesses, diameters and number or shape of teeth thereon. Also that it is equally capable of sharpening both left and right hand cutters, as well as both sides of the cutter teeth thereof, and that such cutting or sharpening operations can be carried out with the utmost dispatch and precision by relatively unskilled labor.

While I have shown and described a preferred embodiment of my invention, it is to be understood that changes in details of construction may be made therein within the range of engineering skill without departing from the invention, for example, if desired, the guide finger 36b may be made to cooperate with the face of a tooth of the cutter other than that presented to the grinding wheel and also that the cutter itself need not be used as a templet to guide the cutter in relation to a grinding wheel.

What I claim is:

1. A sharpening machine for cutters or the like, including a grinding wheel, a support for a wheel or pinion shaped cutter to be ground, and means comprising a copying finger for engaging the side of a tooth of the cutter to be sharpened for causing the cutter wheel to move relatively to the grinding wheel so that the latter will take a cut from the edge of a tooth of said wheel corresponding to the contour of the side of the cutter tooth as the latter is moved relatively to the grinding wheel.

2. A sharpening machine for cutters or the like, including a grinding wheel, a support for a cutter to be ground, and means comprising a copying finger for engaging the side of the tooth of the cutter to be sharpened for causing the cutter tooth to move relatively to the grinding wheel so that the latter will take a cut from the edge of said tooth corresponding to the contour of the side of said cutter tooth as the latter is moved relatively to the grinding wheel.

3. A sharpening machine for cutters or the like, comprising a grinding wheel, a support upon which the cutter to be ground is adapted to rotate, said support being movable transversely to the grinding wheel, and a finger for engaging the side of a tooth of the cutter for causing said cutter to rotate about its axis as the support is moved transversely to the grinding wheel.

4. A sharpening machine for cutters or the like, comprising a grinding wheel, a support upon which the cutter to be ground is adapted to rotate, said support being movable transversely to the grinding wheel, a finger for engaging the side of a tooth of the cutter for causing said cutter to rotate about its axis as the support is moved transversely to the grinding wheel, and spring means normally urging said finger into such engagement.

5. A sharpening machine for cutters or the like, comprising a grinding wheel, a support upon which the cutter to be ground is adapted to rotate, said support being movable transversely to the grinding wheel, and a finger for engaging the side of a tooth of the cutter for causing said cutter to rotate about its axis as the support is moved transversely to the grinding wheel, said finger being adjustable to engage either side of a cutter tooth.

6. A sharpening machine for gear-shaped cutters or the like, comprising a grinding wheel, a support upon which the cutter to be ground is adapted to rotate, said support being movable transversely to the grinding wheel, contact means for engaging and rotating the cutter about its axis as the support is moved transversely to the grinding wheel, and means for presenting successive teeth of the cutter to the grinding wheel.

7. A sharpening machine for gear-shaped cutters or the like, comprising a grinding wheel, a support upon which the cutter to be ground is adapted to rotate, said support being movable transversely to the grinding wheel, a finger for engaging the side of a tooth of the cutter for causing said cutter to rotate about its axis as the support is moved transversely to the grinding wheel, and means for rotating the cutter for presenting successive teeth of the cutter to the grinding wheel.

8. A sharpening machine for gear-shaped cutters or the like, comprising a grinding wheel, a support upon which the cutter to be ground is adapted to rotate, said support being movable transversely to the grinding wheel, a finger for engaging the side of a tooth of the cutter for causing said cutter to rotate about its axis as the support is moved transversely to the grinding wheel, and means for moving the cutter out of engagement with the finger to permit the cutter to be rotated for presenting successive teeth of the cutter to the grinding wheel.

9. A sharpening machine for gear-shaped cutters or the like, comprising a grinding wheel, a support upon which the cutter to be ground is adapted to rotate, said support being movable transversely to the grinding wheel, a finger for engaging the side of a tooth of the cutter for causing said cutter to rotate about its axis as the support is moved transversely to the grinding wheel, and means for moving the cutter out of engagement with both the finger and the grinding wheel to permit the cutter to be rotated for presenting successive teeth of the cutter to the grinding wheel.

10. A sharpening machine for gear-shaped cutters or the like, comprising a grinding wheel, a support upon which the cutter to be ground is adapted to rotate, said support being movable transversely to the grinding wheel, contact means for engaging and rotating the cutter about its axis as the support is moved transversely to the grinding wheel, and indexing means comprising a toothed wheel operatively connected to the cutter support and a latch-controlled lever for rotating said toothed wheel for rotating the cutter support for presenting successive teeth of the cutter to the grinding wheel.

11. A sharpening machine for gear-shaped cutters or the like, comprising a grinding wheel, a support upon which the cutter to be ground is adapted to rotate, said support being movable transversely to the grinding wheel to present the cutter thereto, means engaging the cutter for causing rotation thereof about its axis as the cutter is moved transversely to the grinding wheel, means for moving the cutter along its axis to take it out of the range of engagement with the grinding wheel, and a spring-controlled ratchet device for rotating the cutter about its axis independently of the first-mentioned cutter engaging means for presenting successive teeth of the cutter to the grinding wheel.

12. A sharpening machine for cutters or the like, comprising a grinding wheel, a support upon which the cutter to be ground is adapted to rotate, said support being movable in a horizontal plane transversely to the grinding wheel to present the cutter thereto, means engaging a tooth of the cutter for causing rotation thereof about its axis as the cutter is moved transversely to the grinding wheel, and a quick-acting screw for moving the cutter out of its horizontal plane to take it out of the range of engagement with the grinding wheel.

13. A sharpening machine for cutters or the like, comprising a grinding wheel having a disc surface and a curved surface of revolution about the axis of the grinding wheel, a support upon which the cutter to be ground is adapted to rotate, said support being movable transversely to the grinding wheel, a finger adapted to engage either a positive or a negative side of a tooth of the cutter for causing said cutter to rotate about its axis as the support is moved transversely to the grinding wheel to permit of either a convex or a concave cut being taken from the edge of the tooth.

14. A method of sharpening the teeth of a gear shaped cutter, which comprises causing a tooth and a grinding wheel in contact with the cutting edge of said tooth to move relatively to each other in a desired curve whereby the grinding wheel will take a cut from the edge of the tooth along a line corresponding to the curvature of the side of the tooth and controlling said relative movement by the movement of a tracer element over the side of a tooth of the gear shaped cutter being sharpened.

15. A method of sharpening a gear cutter tooth, which comprises causing the tooth and a grinding wheel in contact with the cutting edge of said tooth to move relatively to each other in a desired curve whereby the grinding wheel will take a cut from the edge of the tooth along the line corresponding to the curvature of the side of the tooth and controlling said relative movement by the movement of a tracer element over the surface of the side of the tooth being sharpened.

16. The method of sharpening a gear cutter tooth, which comprises causing the tooth to move past a grinding wheel in a curve corresponding to the curvature of either the positive or negative side of the tooth to be sharpened by imparting to the cutter motion of translation in a plane at a right angle to its axis while constraining the tooth being sharpened to move in the desired curve by a tracer element engaging the side face of a tooth of the cutter.

WILLIAM E. SYKES.

CERTIFICATE OF CORRECTION.

Patent No. 2,124,990. July 26, 1938.

WILLIAM E. SYKES.

It is hereby certified that error appears in the printed specification of the above numbered patent requiring correction as follows: Page 2, second column, line 62, for "gey" read key; page 4, first column, line 25, strike out the words "manipulated so as to rotate the cutter about its; and that the said Letters Patent should be read with this correction therein that the same may conform to the record of the case in the Patent Office.

Signed and sealed this 30th day of August, A. D. 1938.

(Seal) Acting Commissioner of Patents.

for presenting successive teeth of the cutter to the grinding wheel.

10. A sharpening machine for gear-shaped cutters or the like, comprising a grinding wheel, a support upon which the cutter to be ground is adapted to rotate, said support being movable transversely to the grinding wheel, contact means for engaging and rotating the cutter about its axis as the support is moved transversely to the grinding wheel, and indexing means comprising a toothed wheel operatively connected to the cutter support and a latch-controlled lever for rotating said toothed wheel for rotating the cutter support for presenting successive teeth of the cutter to the grinding wheel.

11. A sharpening machine for gear-shaped cutters or the like, comprising a grinding wheel, a support upon which the cutter to be ground is adapted to rotate, said support being movable transversely to the grinding wheel to present the cutter thereto, means engaging the cutter for causing rotation thereof about its axis as the cutter is moved transversely to the grinding wheel, means for moving the cutter along its axis to take it out of the range of engagement with the grinding wheel, and a spring-controlled ratchet device for rotating the cutter about its axis independently of the first-mentioned cutter engaging means for presenting successive teeth of the cutter to the grinding wheel.

12. A sharpening machine for cutters or the like, comprising a grinding wheel, a support upon which the cutter to be ground is adapted to rotate, said support being movable in a horizontal plane transversely to the grinding wheel to present the cutter thereto, means engaging a tooth of the cutter for causing rotation thereof about its axis as the cutter is moved transversely to the grinding wheel, and a quick-acting screw for moving the cutter out of its horizontal plane to take it out of the range of engagement with the grinding wheel.

13. A sharpening machine for cutters or the like, comprising a grinding wheel having a disc surface and a curved surface of revolution about the axis of the grinding wheel, a support upon which the cutter to be ground is adapted to rotate, said support being movable transversely to the grinding wheel, a finger adapted to engage either a positive or a negative side of a tooth of the cutter for causing said cutter to rotate about its axis as the support is moved transversely to the grinding wheel to permit of either a convex or a concave cut being taken from the edge of the tooth.

14. A method of sharpening the teeth of a gear shaped cutter, which comprises causing a tooth and a grinding wheel in contact with the cutting edge of said tooth to move relatively to each other in a desired curve whereby the grinding wheel will take a cut from the edge of the tooth along a line corresponding to the curvature of the side of the tooth and controlling said relative movement by the movement of a tracer element over the side of a tooth of the gear shaped cutter being sharpened.

15. A method of sharpening a gear cutter tooth, which comprises causing the tooth and a grinding wheel in contact with the cutting edge of said tooth to move relatively to each other in a desired curve whereby the grinding wheel will take a cut from the edge of the tooth along the line corresponding to the curvature of the side of the tooth and controlling said relative movement by the movement of a tracer element over the surface of the side of the tooth being sharpened.

16. The method of sharpening a gear cutter tooth, which comprises causing the tooth to move past a grinding wheel in a curve corresponding to the curvature of either the positive or negative side of the tooth to be sharpened by imparting to the cutter motion of translation in a plane at a right angle to its axis while constraining the tooth being sharpened to move in the desired curve by a tracer element engaging the side face of a tooth of the cutter.

WILLIAM E. SYKES.

CERTIFICATE OF CORRECTION.

Patent No. 2,124,990.               July 26, 1938.

WILLIAM E. SYKES.

It is hereby certified that error appears in the printed specification of the above numbered patent requiring correction as follows: Page 2, second column, line 62, for "gey" read key; page 4, first column, line 25, strike out the words "manipulated so as to rotate the cutter about its; and that the said Letters Patent should be read with this correction therein that the same may conform to the record of the case in the Patent Office.

Signed and sealed this 30th day of August, A. D. 1938.

(Seal)                                     Acting Commissioner of Patents.